June 22, 1954 D. JACKSON ET AL 2,681,947

TELEVISION CAMERA ASSEMBLY

Filed Dec. 15, 1949 3 Sheets-Sheet 1

Inventors
DONALD JACKSON AND
DONALD ROBERT COLEMAN
By Blair + Black
Attorneys

Inventors
DONALD JACKSON AND
DONALD ROBERT COLEMAN
By Blair + Black
Attorneys

June 22, 1954 D. JACKSON ET AL 2,681,947

TELEVISION CAMERA ASSEMBLY

Filed Dec. 15, 1949 3 Sheets-Sheet 3

Inventors
DONALD JACKSON AND
DONALD ROBERT COLEMAN
By Blair + Black
Attorneys

Patented June 22, 1954

2,681,947

UNITED STATES PATENT OFFICE 2,681,947

TELEVISION CAMERA ASSEMBLY

Donald Jackson and Donald R. Coleman, Cambridge, England, assignors to Pye Limited, Cambridge, England, a British company Application December 15, 1949, Serial No. 134,436

Claims priority, application Great Britain December 17, 1948

14 Claims. (Cl. 178—7.2)

The present invention relates to television cameras, and more particularly to the mounting of the television pick-up tubes therein. In television cameras as hitherto constructed, when it is necessary to replace the pick-up tube, considerable time is taken in accurately locating the new tube in position. The difficulty is due to the fact that the glass envelopes of different tubes are not all of identical size and shape, as a result of which adjustments have to be made when mounting a new tube on its support in order that the photo-cathode or mosaic may be accurately located with respect to the camera lens.

The present invention relates to improvements in the arrangement of the pick-up tube in the camera which greatly simplify the fitting of a new pick-up tube. A further object is to reduce the skill required for effecting the replacement of the pick-up tube and connections in fitting the new tube in position.

According to the present invention, the pick-up tube is mounted in a supporting frame-work or box having a mounting member or members by which the frame-work or box can be mounted in the camera, the tube being mounted in the frame-work or box with its optical elements accurately located with respect to the mounting members whereby, to replace a pick-up tube in the camera, it is only necessary to remove the frame-work or box carrying the one pick-up tube and replace it by another frame-work or box carrying another accurately located pick-up tube. The mounting members are preferably constituted by accurate machined guide members which co-operate, preferably in a sliding manner, with complementary members mounted in the camera, whereby the frame-work or box can be readily slid into engagement with the member carried by the camera and locked in position, preferably by a single fixing screw or the like.

The frame-work or box also carries the head amplifier and other ancillary equipment for the pick-up tube, whereby the electrical connection between the tube and the head amplifier and ancillary equipment may all be completed before the frame-work or box is inserted in the camera. The leads to the head amplifier and ancillary equipment may terminate in multiple connectors, and are all preferably embodied in a single cable provided with a single multiple connector, whereby when the frame-work or box is positioned in the camera it is only necessary to plug in the one or more connectors in order to complete the circuit connections to the new pick-up tube unit.

In order that the invention may be more clearly understood, an embodiment thereof will now be described with reference to the accompanying drawings, in which—

Figure 1:
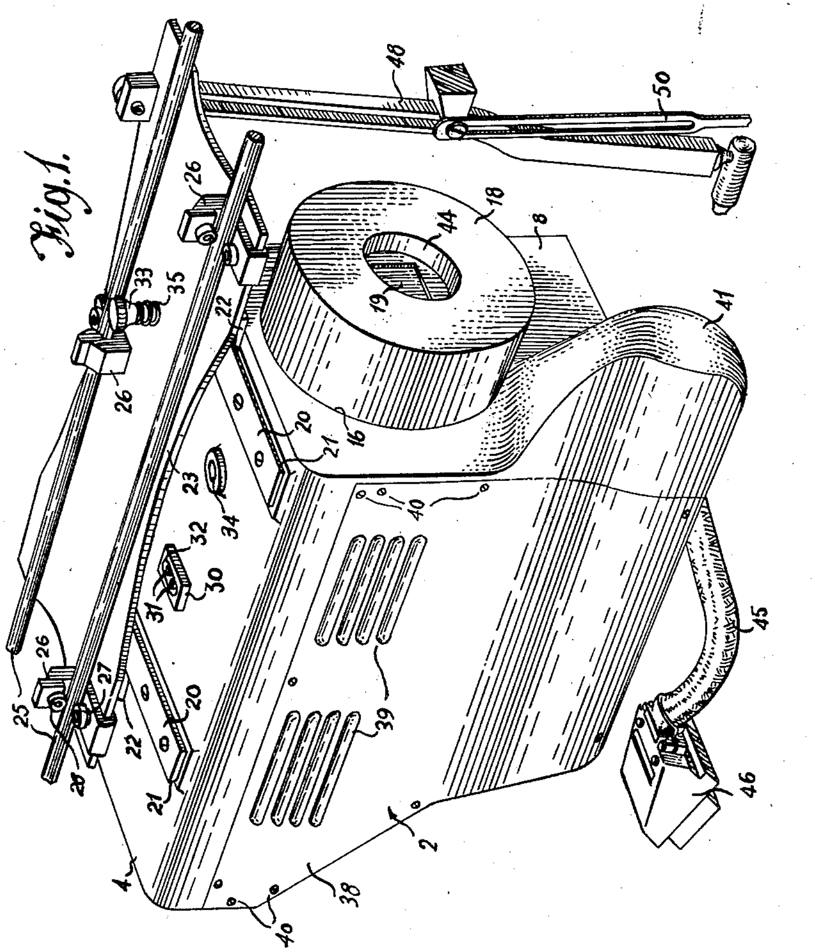
Figure 1 shows a perspective view of the pick-up tube box partly inserted in the supporting cradle in the camera.
Figure 2:
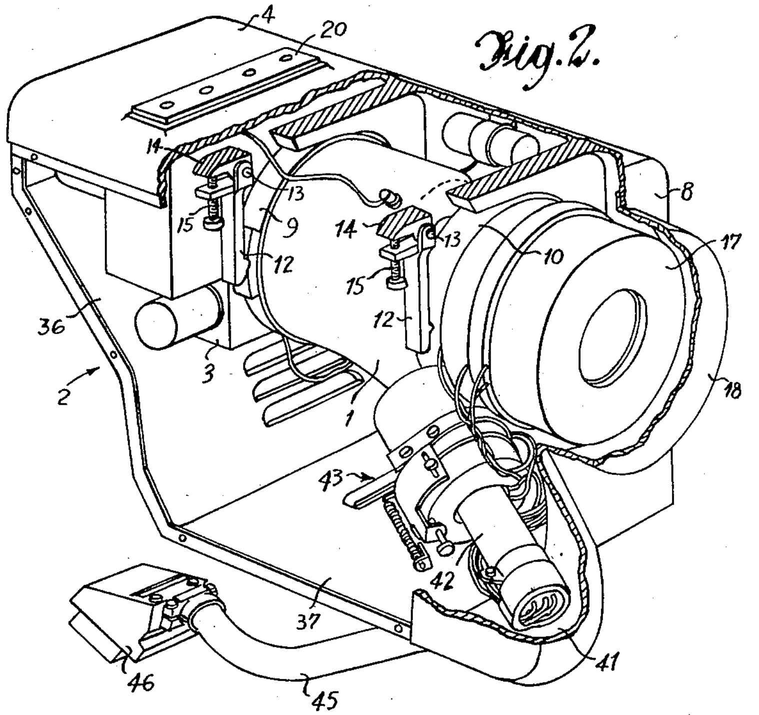
Figure 2 shows a perspective view of the pick-up tube box, partly cut away to show the arrangement of the apparatus therein.
Figure 3:
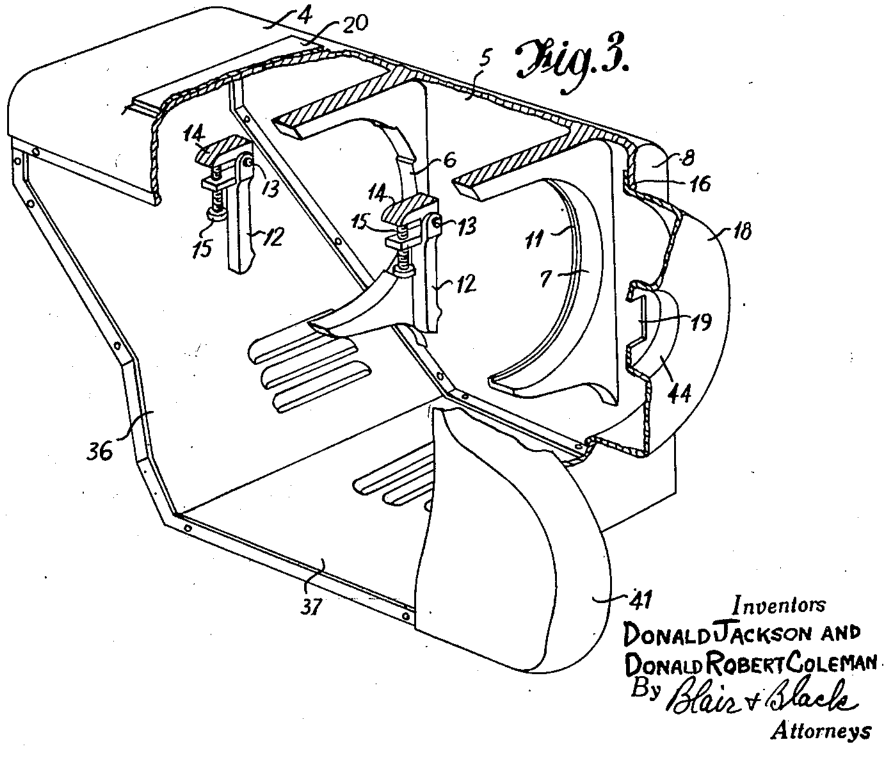
Figure 3 is a cut-away view similar to Figure 2, but with the pick-up tube and ancillary apparatus removed.
Figure 4:
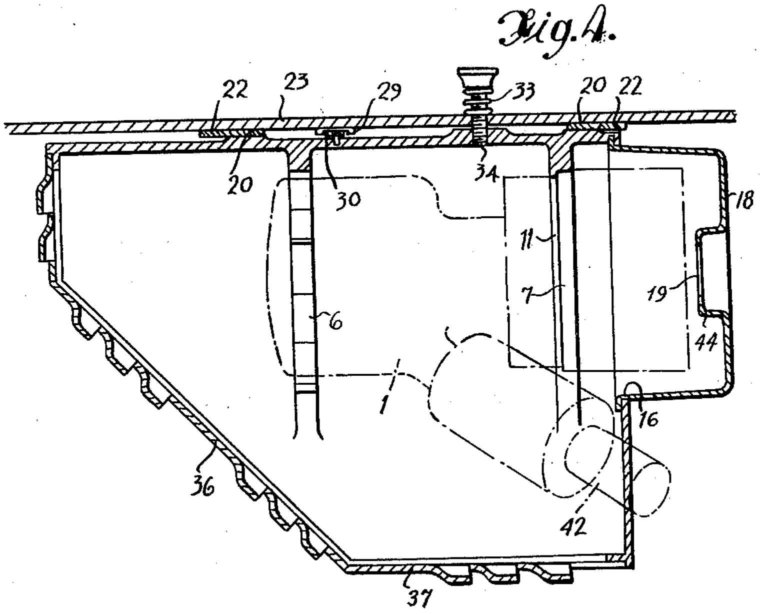
Figure 4 is a longitudinal section through the pick-up tube box and cradle.
Figure 5:
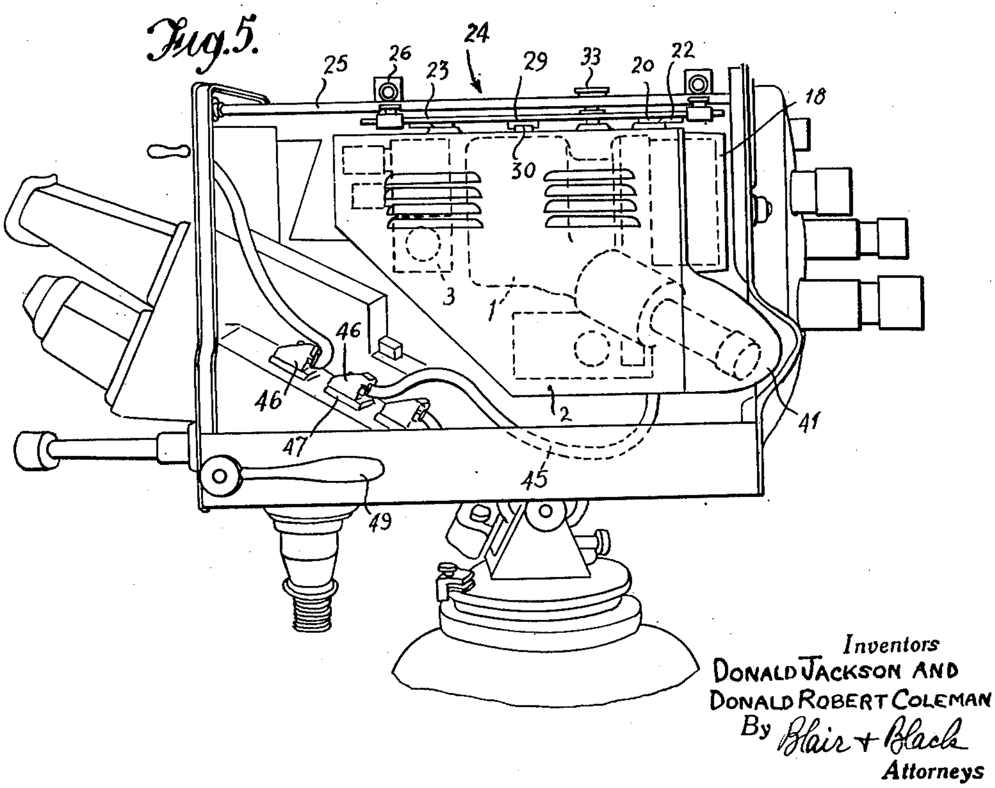
Figure 5 is a side elevation of a television camera with the pick-up tube box mounted therein.

Referring to the drawings, the pick-up tube 1 is mounted in a box 2 which also contains the head amplifier 3 and other ancillary equipment. The top 4 and one side wall 5 of the box are preferably made as an integral casting with saddle portions 6, 7 carried by the inner surface of the side wall 5. The front wall 8 of the box may also be cast integral with the top 4 and side wall 5, or may be a separate casting secured to the top and side wall. The tube 1 is fitted with a pair of annular members 9, 10 which members are accurately located with respect to the optical elements of the tube and adapted to fit in the saddle members 6 and 7 respectively. At least one of the saddle members, for example 7, may be formed with a ridge 11 in order approximately to locate the longitudinal position of the tube 1 within the box. The tube is secured in the saddle members by suitable clamps, shown in the embodiment as comprising bell-crank levers 12, carried by pivots 13 from bearing blocks 14 cast integral with the inner surface of the top 4 of the box, one arm of each of the bell-crank levers 12 being adapted to engage with the annular members 9, 10 respectively on the pick-up tube 1 at the side thereof opposite to the saddle members, and the other arm of each bell-crank lever having a screw 15 passing therethrough of which the end is adapted to be screwed against the surface of the bearing block 14 whereby each bell crank lever is urged to bear against its associated annular member to hold the tube 1 in position in the saddle members. The tube 1 can be rotated within the saddle members and moved longitudinally with respect thereto in order to adjust its position.

The front wall 8 of the box is formed with a large aperture 16 through which the front end of the tube 1 and the pot 17 carrying the image focus coil may project. The aperture is fitted with a tubular cover 18 to enclose the projecting portion of the tube, the front of this cover, which is conveniently made as a metal stamping, being closed and formed with a rectangular aperture 19 to define the picture area. By providing this rectangular aperture on the box instead of on the tube, its position remains unchanged when the tube is rotated.

To the top 4 of the box are secured two slides 20 which extend transversely across the top 4 and have their outwardly directed side faces 21 inclined to form a V-slide member adapted to fit with a pair of complementary slides 22 carried by the cradle 23 mounted within the camera 24. This cradle 23 is carried within the camera, for example on a pair of slide bars 25 extending longitudinally of the camera, whereby the cradle may be moved back and forth for focussing purposes. The cradle may comprise a substantially flat plate member having brackets 26 on its upper surface, each bracket carrying horizontal and vertically disposed rollers 27, 28 adapted to engage with the rods 25 whereby the cradle may be moved along the slide bars 25 in the camera.

The cradle 23 also carries on its under surface a stop 29 adapted to engage with a stop 30 on the top of the box to limit the extent by which the box can be pushed into the guides, and thus locate it and the pick-up tube accurately with respect to the optical axis of the camera lens. The stop 30 on the box is adjustable transversely by its securing screws 31 passing through an elongated transverse slot 32 therein, so that its setting can be adjusted with respect to the pick-up tube mounted within the box.

Passing through the cradle 23 is also a single bolt 33 having a knurled head which can be screwed into a threaded aperture 34 in the top of the box, when it is mounted beneath the cradle, to hold the box in position. This bolt 33 may be captive and is provided with a spring 35 for normally holding the bolt raised to allow ready removal and insertion of the box in the cradle.

The back 36, bottom 37 and other side wall 38 of the box may be made from sheet metal and may be provided with ventilating louvres 39. They may be secured to the casing and to one another by means of screws 40 so that they may be removed for servicing the equipment within the box. In order to make the box as compact as possible, the back wall 36 may extend vertically downwards for a short distance and then be inclined forwardly to meet the bottom wall 37. The chassis for the head amplifier 3 is carried from the under surface of the top wall. The front wall 8 of the box may be provided with a projection 41 to accommodate the end of the side tube 42 of the pick-up tube 1, which side tube contains the electron gun for scanning the tube. The deflecting and focussing coils 43 for the electron gun of the tube may be carried from the annular member 10 by a suitable bracket.

The front wall of the cover 18 is formed with a recess 44 around the rectangular apparatus 17. This recess is preferably circular and serves to accommodate any light filter which it may be desired to position in front of the pick-up tube.

All the leads to the amplifier and pick-up tube are passed through a single screened cable 35 to a multi-contact plug connector 46 which is adapted to fit into a corresponding socket 47 in the camera.

It will be appreciated that with the arrangement described, the pick-up tube can be accurately positioned in the box and with respect to the slide guides 20 thereof, and the head amplifier and other ancillary equipment and the deflecting and focussing coils correctly adjusted before the box is inserted within the camera. This may be carried out in the factory by the use of an optical bench and other testing equipment. Thus when it is necessary to change the pick-up tube in a camera, it is only necessary to replace the existing pick-up tube box with another box of which the pick-up tube, head amplifier and ancillary equipment have all been accurately pre-adjusted, and to plug in the connector 46 from the new box into the socket 47 in the camera.

The cradle 23 is adapted to be moved back and forth by the focussing control mechanism (parts of which are shown at 48 in Fig. 1) actuated by the focussing control handle 49. In the case of a camera provided with a rotatable lens turret, this focus control mechanism may be constructed as described in the specification of co-pending application Serial No. 81,234 filed March 14, 1949 so that the focussing movement of the cradle will be automatically varied depending upon the lens which is positioned in front of the pick-up tube. In order to facilitate the insertion of the box, means may be provided for moving the cradle to a rearward position and thus afford clearance for the projecting portion at the front of the box to be inserted easily into the camera casing. This means may comprise a pull-rod 50 as described in the aforesaid co-pending application Serial No. 81,234. This pull-rod extends through the bottom of the camera casing so that when it is pulled down it moves the focussing control mechanism so that the cradle may be moved by the lever 49 to its extreme rearward position. A latch may be provided for holding the rod 50 in this position while the pick-up tube box is being changed, whereafter the latch may be released to restore the focussing control mechanism to act in its normal manner.

Whilst a particular embodiment has been described, it will be understood that various modifications may be made without departing from the scope of the invention.

We claim:

1. A television camera comprising a pick-up tube, an auxiliary framework in which the pick-up tube is detachably mounted, a camera framework determining a lens position and an optical axis through said position, a focussing slide movable in the camera in the direction of said axis, said slide and auxiliary framework having means for locating and detachably securing said auxiliary framework, relative to said slide, actuating mechanism for said slide including a lever, means for actuating one point of said lever, means for transmitting movement to said slide from another point of said lever and an adjustable fulcrum member for varying the transmission ratio of said lever.

2. A television camera comprising a lens, a framework determining an operative position for said lens and an optical axis through said position, a pick-up tube unit having guide members, a focussing slide equipped with means for detachably supporting said pick-up tube unit and for locating and locking such unit relatively to the slide, said slide being mounted for focussing movement relative to said framework in the direction of said optical axis, and said supporting and locking means including complementary guide rail members extending transversely of the direction of movement of the slide for co-operation with said guide members of the pick-up tube unit and stop means for locating said unit in the direction of said rail members, and means for actuating said slide to effect focussing movements of said slide.

3. A pick-up tube unit for a television camera, comprising a pick-up tube having a substantially plane image-receiving element, a box in which said tube is detachably mounted, said box having guide members extending parallel to the plane of said image-receiving element for sliding engagement with the camera and a stop for limiting the sliding movement of said guide members in the camera, said tube being so positioned in said box that said image-receiving element has an accurately predetermined spatial relation to the guide members and stop, focus and deflector coils for the tube secured in appropriate spatial relation to the tube, said coils and holding means being mounted in said box and at least some of said holding means being adjustable, a head amplifier for the tube also mounted in the box, and wiring establishing connections between the elements in the box, and further wiring for establishing external connections for all said elements, said further wiring terminating in multiple coupling means.

4. A pick-up tube unit for a television camera comprising a pick-up tube having a substantially plane image-receiving element, a structure in which said tube is detachably mounted, said structure having guide members extending parallel to the plane of said image-receiving element for sliding engagement with the camera, a stop for engagement with the camera to limit the sliding movement of said guide members in the camera, said tube being mounted in said structure with its image-receiving element having an accurately predetermined spatial relation to the guide members and stop, focus and deflector coils for the tube, secured in appropriate spatial relation to the tube, a head amplifier for the tube also mounted in the structure, and wiring establishing connections between the elements in the structure, and further wiring for establishing external connections for all said elements, said further wiring terminating in multiple coupling means.

5. A pick-up tube unit for a television camera comprising a pick-up tube having an image-receiving element and equipped with a pair of coaxially disposed substantially annular mounting members, said members presenting cylindrical locating surfaces having a predetermined spatial relation to said image-receiving element, a box in which said tube is detachably mounted, said box having in its interior mounting means co-operating with said locating surfaces of the tube for supporting the tube inside the box while permitting adjustment about and in the direction of the axis of the mounting members of the tube, and having guide members extending transversely of said axis for sliding engagement with the camera and an adjustable stop for cooperation with the camera to limit the sliding movement of said guide members in the camera, and a head amplifier mounted in the box and connected to amplify the picture signals generated in the pick-up tube.

6. A unit as claimed in claim 5, further comprising a cover plate carried by the box, said cover plate having a substantially rectangular aperture to define the picture area.

7. A pick-up tube unit for a television camera, comprising a pick-up tube having an image-receiving element and equipped with a pair of coaxially dispased substantially annular mounting members, said members presenting cylindrical locating surfaces having a predetermined spatial relation to said image-receiving element, a box in which said tube is detachably mounted, said box having in its interior mounting means co-operating with said locating surfaces of the tube for supporting the tube inside the box while permitting adjustment about and in the direction of the axis of the mounting members of the tube, and having guide members extending transversely of said axis for sliding engagement with the camera, and an adjustable stop for limiting the sliding movement of said guide members in the camera, focusing means and deflector coils for the tube, holding means within the box for holding said focussing means and said deflector coils in appropriate spatial relation to the tube, a head amplifier for the tube also mounted in the box, and conductors connecting with said pick-up tube, with said coils and with said head amplifier, said conductors extending outside said box and terminating in a multiple coupling member.

8. A television camera, comprising a camera housing having a lens, a focussing slide mounted in the camera for focussing movement towards and away from the lens, actuating means for moving said slide, a pick-up tube unit detachably mounted on said focussing slide and including a pick-up tube having an optical element on which an object to be televised must be focussed by said lens, means for detachably securing said pick-up tube unit to said slide, and pre-set interengaging locating means on said slide and said tube unit for ensuring an accurately predetermined location and disposition of the optical element of the tube relative to the focussing slide when said tube unit is secured to said slide.

9. A television camera, comprising a camera housing determining a lens position, a focussing slide mounted in said camera housing for horizontal focussing movement towards and away from said lens position, actuating means for said focussing slide, and a pick-up tube unit detachably secured to said focussing slide for focussing movement jointly therewith, a pair of undercut linear guide members on said focussing slide, extending at right angles to the direction of movement of said slide, a pair of complementary undercut linear guide members on said pick-up tube unit, cooperating in dovetail fashion with said guide members of the slide, and cooperating locating means on the tube unit and slide respectively determining a normal position of said tube unit in said guide members.

10. A television camera as claimed in claim 9, wherein said locating means including a stop on said slide and a complementary stop lug adjustably secured on the tube unit.

11. In a television camera having a pick-up tube mounted on a focussing slide fitted for linear movement in the camera: a unitary pick-up tube unit comprising a box having a window, a pick-up tube having a substantially plane optical element on which an object to be televised must be optically focussed, said tube being mounted in said box with said optical element facing said window, two parallel guides on said box extending in a direction parallel to the plane of said optical element, complementary guides on said focussing slide with which said guides of the tube unit co-operate, said guides extending transversely to the direction of said linear movement;

co-operating strip means on the tube unit and focussing slide respectively for limiting sliding movement of said guides relative to said complementary guides, and a clamping screw rotatably mounted in the focussing slide, the tube unit having screw threads for engagement by said screw to pull said unit against said slide.

12. For a television camera, a pick-up tube unit comprising a box, a pick-up tube adjustably mounted within said box, said pick-up tube having an optical element determining an optical axis, and said box having an aperture in approximate alignment with said optical axis, a pair of guide slides on said box extending in the direction at right angles to said axis, an adjustable stop member carried by said box, an amplifier within said box and connected to amplify the output from said pick-up tube, a multi-contact connecting plug, and conductors from said pick-up tube and amplifier leading to the contacts of said plug.

13. In a television camera including a focussing slide, a pick-up tube and a head amplifier for cooperation with said tube; an exchangeable unitary pick-up tube unit comprising a supporting structure detachably mounted on the focussing slide of the camera, and said pick-up tube and said head amplifier both mounted on said structure.

14. In a television camera having a pick-up tube carried by a focussing slide movable in the camera and a head amplifier for coperation with such tube, the arrangement of such tube and amplifier in a unitary tube unit, said unit comprising supporting structure, a pick-up tube mounted on said strcture, and a head amplifier operatively connected with said tube and also mounted on said structure, said structure and the focussing slide of the camera being formed with complementary locating means for determining the position of said unit relative to said slide, and said unit being detachably secured to said slide.

References Cited in the file of this patent

UNITED STATES PATENTS

| Number | Name | Date |
| --- | --- | --- |
| 2,162,908 | Bedford | June 20, 1939 |
| 2,285,509 | Goshaw | June 9, 1942 |
| 2,315,406 | Eddy | Mar. 30, 1943 |
| 2,380,829 | Eddy | July 31, 1945 |
| 2,424,513 | Stephan | July 22, 1947 |
| 2,467,185 | Cady | Apr. 12, 1949 |
| 2,572,729 | Jackson et al. | Oct. 23, 1951 |